US008819030B1

United States Patent
Freed et al.

(10) Patent No.: US 8,819,030 B1
(45) Date of Patent: *Aug. 26, 2014

(54) AUTOMATED TAG SUGGESTIONS

(71) Applicant: Amazon Technologies, Inc., Reno, NV (US)

(72) Inventors: Ian W. Freed, Seattle, WA (US); Keela N. Robison, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/059,333

(22) Filed: Oct. 21, 2013

Related U.S. Application Data

(63) Continuation of application No. 13/170,160, filed on Jun. 27, 2011, now Pat. No. 8,566,329.

(51) Int. Cl.
*G06F 17/30* (2006.01)
(52) U.S. Cl.
USPC .......................... 707/748; 707/913; 707/915
(58) Field of Classification Search
CPC ................ G06F 17/30247; G06F 17/30277
USPC ................... 707/723, 748, 913, 915
See application file for complete search history.

(56) References Cited

U.S. PATENT DOCUMENTS

| | | | | |
|---|---|---|---|---|
| 8,001,124 | B2* | 8/2011 | Svendsen | 707/736 |
| 8,396,246 | B2* | 3/2013 | Anbalagan et al. | 382/100 |
| 8,411,953 | B2* | 4/2013 | Deluca et al. | 382/181 |
| 2007/0118509 | A1* | 5/2007 | Svendsen | 707/3 |
| 2008/0065995 | A1* | 3/2008 | Bell et al. | 715/751 |
| 2008/0120328 | A1* | 5/2008 | Delgo et al. | 707/102 |
| 2010/0029326 | A1* | 2/2010 | Bergstrom et al. | 455/556.1 |
| 2011/0040779 | A1* | 2/2011 | Svendsen | 707/767 |
| 2011/0145258 | A1* | 6/2011 | Kankainen | 707/746 |
| 2011/0191271 | A1* | 8/2011 | Baker et al. | 706/11 |
| 2011/0282878 | A1* | 11/2011 | Bird et al. | 707/740 |
| 2012/0105474 | A1* | 5/2012 | Cudalbu et al. | 345/633 |
| 2012/0148158 | A1* | 6/2012 | Despain | 382/190 |
| 2012/0158686 | A1* | 6/2012 | Hua et al. | 707/706 |
| 2012/0158716 | A1* | 6/2012 | Zwol et al. | 707/728 |
| 2012/0219191 | A1* | 8/2012 | Benzarti et al. | 382/106 |
| 2012/0230539 | A1* | 9/2012 | Calman et al. | 382/103 |

* cited by examiner

*Primary Examiner* — Phong Nguyen
(74) *Attorney, Agent, or Firm* — Novak Druce Connolly Bove + Quigg LLP

(57) ABSTRACT

Suggestions can be automatically provided to a user to enable a user to tag various electronic files or objects without having to think up or manually enter the tags. A tag suggestion algorithm can analyze various types of information, such as location, time of day, objects or persons associated with the file, and tags generated by other users for that type of file. A user can be presented with a list of suggested tags, and can select one or more tags to apply to the file. Once at least one tag is applied to a file, a user can perform a tag-inclusive search to locate that file.

20 Claims, 7 Drawing Sheets

AUTOMATED TAG SUGGESTIONS

CROSS-REFERENCES TO RELATED APPLICATIONS

This application is a continuation of allowed U.S. application Ser. No. 13/170,160, entitled "Automated Tag Suggestions," filed Jun. 27, 2011; and issuing as U.S. Pat. No. 8,566,329 on Oct. 22, 2013, which is incorporated herein by reference for all purposes.

BACKGROUND

People are increasingly relying upon computing devices to obtain, store, and retrieve various types of content, such as personal photos, music, and video files. While each of these files will have some type of file name, users generally do not remember the filenames and instead rely on the files being in certain folders, or having searchable data provided with the files. For example, a digital music file purchased from a music provider will generally include data enabling that file to be located by specific information, such as artist or title. In many cases, however, a user might not remember the artist or title of a song, which can make locating that song difficult. Further, a user generally will not have the ability to add to this data to assist with searching or provide additional information about that song.

Various other types of content will generally not have any such associated data. For example, a digital picture captured by the device or a media file recorded on the device will not include identifying data, other than potentially specific information such as the date and time at which the file was captured. Users typically have to manually name or organize these files in order to be able to locate and retrieve those files at a later time. Certain systems and services enable a user to provide a tag or label with various types of files, but these tags typically have to be manually entered by the user, which can be time consuming and, in the case of small portable devices such as cell phones, difficult when a long tag has to be typed by the user on a small keyboard or otherwise entered on the portable device.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to tagging files or objects in an electronic environment. In particular, various embodiments utilize one or more tag suggestion algorithms to suggest various tags or tag combinations that a user can select to associate with a particular file or object. Once at least one tag is associated with a file of object, a user can attempt to locate that file or object based at least in part upon the tags associated with that file or object.

Figure 1:
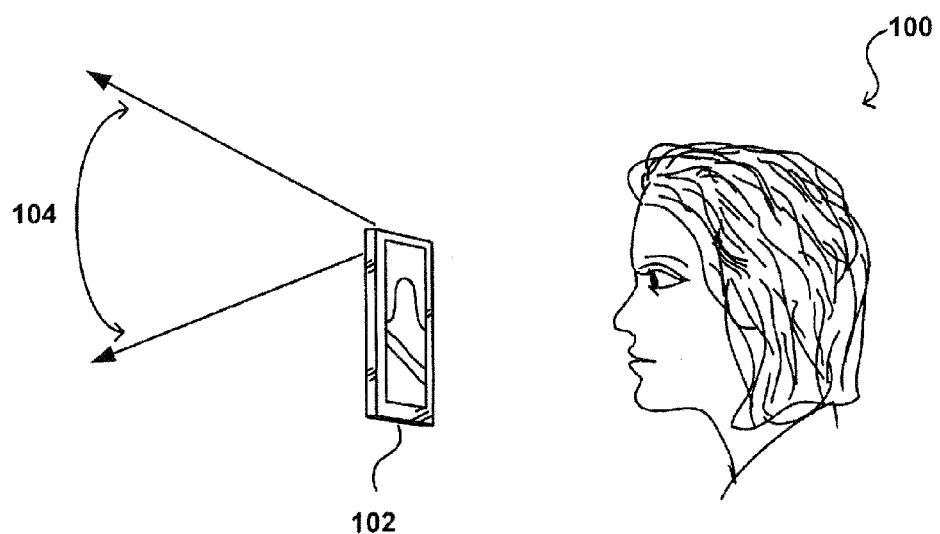
FIG. 1 illustrates an example environment in which various aspects can be implemented in accordance with various embodiments.

For example, FIG. 1 illustrates a situation where a user 100 of a portable computing device 102 is attempting to capture an image of one or more objects contained within an angular capture range 104 of at least one imaging element of the computing device. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, digital cameras, digital audio recorders, and portable media players, among others. Each image capture element may be, for example, a camera, a charge-coupled device (CCD), a heat detection sensor, or an infrared sensor, or can utilize another image capturing technology.

As discussed above, a user of a conventional device might generate a filename that has some meaning with respect to what is contained in the file. For example, if the user is capturing a picture of Mt. Ranier on a trip to Seattle, the user might manually enter a filename such as "mt_ranier.jpg". For a large collection of images, such an approach can be undesirably time consuming, and potentially frustrating if the user has to think of unique descriptions for each such image. More often, a user will let the device assign a default filename according to a naming scheme of the device, and then store that file to a folder such as "Seattle vacation" that can enable a user to at least group certain photos together. A user will often then search for a picture by viewing thumbnail images of files within that folder. For folders with a large number of photos this can be very time consuming, particularly for users of portable devices such as smart phones that must download the image over what might be a relatively slow connection to a device that may not have sufficient memory to store and display a large number of images. Further, the user might have to pay for the bandwidth to download a large number of images, which can be involve a large amount of data and, thus, a relatively expensive charge for the search.

Figure 2:
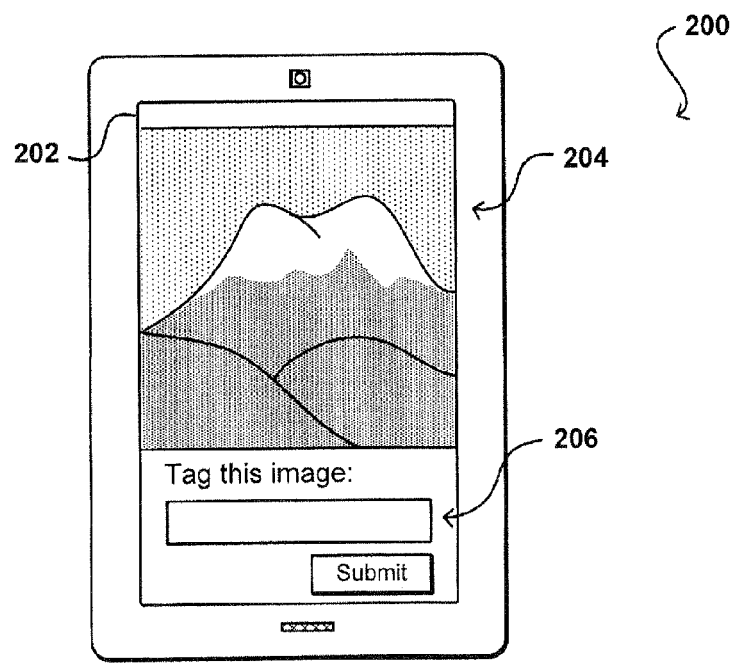
FIG. 2 illustrates an image tagging approach that can be used in accordance with various embodiments.

Systems and methods in accordance with various embodiments can enable a user to tag various digital or electronic objects, such as media files, documents, and the like, and then search for those objects using the applied tags. For example, FIG. 2 illustrates an example wherein a computing device 200 is displaying an image 204 on a display element 202 of the device. The image could have been captured using an image capture element of the computing device or otherwise obtained, such as by downloading from another device or transferring from a digital camera. In this example, an interface on the device 200 provides at least one interface element 206, such as a text box or text field, enabling a user to manually enter a tag for the image. Any appropriate technology can be used to enter the information, such as by typing on a virtual keyboard, using swipe entry on a touch screen, using voice recognition, etc. As these types of approaches are well known in the art, they will not be discussed in detail herein. In this example, the user could type in a tag such as "Mount Ranier" or "Mountains near Seattle." The tag then can be associated with the image, such as by storing the tag as metadata with the image file or storing in a location that can be mapped to the image, where that location can be local or remote to the device. Any number of approaches known or subsequently developed for associating data with a file or object can be used as appropriate.

As discussed, in many instances the user would prefer to not have to think of an appropriate tag and then manually enter that tag for each image. Further, in some cases the user might not know certain information about the file, such as the name of an object in an image or the artist singing a particular song. Even when the user enters a manual tag, the user might not remember that tag for subsequent searching. For example, if the user entered a tag for the picture of Mt. Ranier such as "Mount Ranier" the user would not be able to subsequently locate that image via a quick search unless the user remembered the name of the mountain. Similarly, the user might misspell the name of the object, which could also hamper subsequent searching of that object.

Figure 3A:
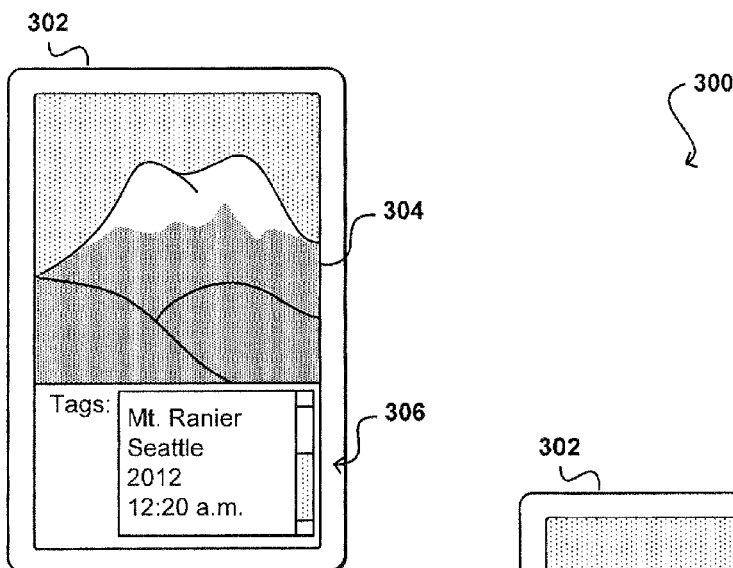
FIGS. 3(a), (b), and (c) illustrate examples of a tagging approach that can be used in accordance with various embodiments.

Systems and methods in accordance with various embodiments can assist a user with tagging various files and objects by utilizing various types of information to suggest useful, relevant, and/or appropriate titles to the user. For example, FIG. 3(a) illustrates an example of a computing device 300 showing an image of Mt. Ranier 304 captured by the device. Since the device captured the image, the device can know certain information about the image. For example, if the device has a global positioning system (GPS) element or is able to determine an approximate location using a process such as triangulation or any other such technology, the device can use that location to suggest one or more potentially appropriate tags 306. For example, if the device can determine that the device is (or was) in the state of Washington when capturing that image, the device can suggest "Washington" as a potential tag for the image. Similarly, if the device has an electronic compass or other such element enabling the device to know the general direction the device is facing, the device (or a system or service in communication with the device) can potentially determine the identify of at least one object in the image based on the direction and location of the device. For example, if the user is a given range of distance south of Seattle and facing a range of angles to the southeast, the device might determine that the device is likely to include Mt. Ranier at least in a background of the image, and thus might select "Mt. Ranier" as a potential tag.

A tag suggestion application or module can also utilize other information available on the device. For example, the user might have a calendar entry at or around the time of the image capture stating a destination, purpose, or other such information. For example, the calendar entry might say "vacation," "trip to Seattle," or "hiking." Accordingly, at least some of these terms or phrases can be identified as potential tags for the image. If the user has entries such as "Flight to Washington" before the image capture and "Flight home" afterwards, then a tag related to Washington might be suggested. In at least some embodiments, where the user has granted permission, the device can also analyze email messages, text messages, instant messages, Web site postings, and other such information to attempt to determine likely tags. For example, if the user "checks in" on a Web site as being at Mount Ranier National Park, or the user tweets that the user is "gazing at Mt Ranier," then the device might be able to identify at least some of the terms as potential tags for the image.

In at least some embodiments, the device can contact at least one system or service available across the Internet or another such network to attempt to identify appropriate tags. For example, a tagging service might track tags that users have used in certain locations. If a certain term appears with a minimum number, frequency, or percentage in tags selected at that location, that term can be identified as a potential tag. For example, if the user is in Mount Ranier National Park then a significant percentage of user tags in that general area might include terms such as "Mount Ranier" and "Washington" such that these terms can be identified as likely tags. Other terms that are used less frequently might not be suggested as those terms might be terms that were particular to the individual tagger. For example, a tag such as "Jane's $30^{th}$ birthday adventure" might not contain any words or phrases that appear with sufficient frequency to identify as a potential tag. Further, some names or other words (e.g., stop words) might not be identified as potential tags, or at least might be filtered from potential tags, in order to help make the tag suggestions be more useful. For example, a common name or term such as "Mike" or "Mom" might be excluded from potential tags unless one or more of those term's have a specific relationship or meaning in that context, such as where a name such as "Bistro Antonia" is part of the name of a restaurant or "Lincoln Memorial" is the name of a monument. In some embodiments, names might be allowed if there is a person or animal identified in the image, but the selection criteria might change as discussed elsewhere herein.

In some embodiments, the tag suggestions from other users can be more accurately identified based upon additional information. For example, if a user is on the valley floor in Yosemite National Park, the device might use the direction in which the device is pointing when capturing the image in addition to its relative location to identify tags that are more appropriate for the capture direction. For example, users pointing in one general direction, or toward a common area, might have a high frequency of tags including "Half Dome" while users in the same general locations but pointing in another general direction, or towards a relatively common position, might have a high frequency of tags including "Yosemite Falls." Thus, a tag suggesting service or application in at least some embodiments can attempt to generate tag mappings that include not only where the device is when capturing the image, but what the device is likely capturing based at least in part upon the capture direction.

Other types of information might be used in that situation as well. For example, the "Half Dome" tag might appear at any time of year, but the "Yosemite Falls" tag might only appear at certain times of year when the falls are flowing, such as from April through late June, when that tag has a high frequency. At other times of year, such as in September, when there might be little to no water coming over the falls, the frequency of a "Yosemite Falls" tag from other users might decrease significantly, which can at least cause the suggestion of that tag to drop in any ranking or suggestion algorithm, etc.

A tag suggestion service or application might also attempt to utilize various other types of information to attempt to identify potential tags. For example, the computing device in FIG. 3(a) could upload the image to a tag suggestion service that could attempt to identify an object in the image through image recognition. In this example, the service might analyze the image and determine that the image includes Mt. Ranier. In various embodiments, the service can return a tag identifying the object, but can also potentially return other related tags, such as the height of the mountain, etc. Such a service can also attempt to identify persons, types of object, etc.

Similarly, a device can capture audio information that can assist in identifying potential tags. For example, if the device uploads audio information to an application or service that can determine the presence of train noises, there can be various tags to be suggested, such as "train" or "Union Station" if combined with position or other such information. If a person captured in an image is talking, voice recognition could potentially be performed to attempt to identify the person in the image in order to suggest that person's name as a tag. If the audio includes noise indicating the user is likely riding in a car during image capture, there can be tags such as "while driving" or "taken from the 405" suggested, etc.

A device might also be able to communicate with other nearby devices, such as over a Bluetooth®, Wi-Fi®, or other wireless channel. In one example, the device can attempt to determine the identity of a person using a nearby device to attempt to suggest that person's name as a tag, particularly where that person's name appears in the user's contact list, friends list, etc. In other embodiments, the device can look to the other person's device to attempt to determine any tags that person might have entered at that location. Any sharing of information between devices can be secured or denied as appropriate in order to comply with privacy expectations, etc.

Figure 3B:
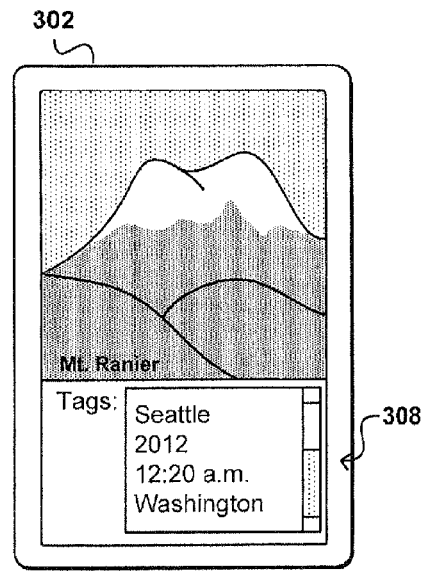

Referring back to FIG. 3(a), it can be seen that a number of tags 306 are suggested that are at least somewhat relevant to the image. In this example, the tags shown include the identity ("Mt. Ranier") of the object in the image, a location ("Seattle") from where the image was likely taken, and date and time information, as might be determined using the existing information on the device, a time associated with the image file, etc. Each of these tags could be suggested using one or more of the approaches above. The user can select one of the selected tags, such as Mt. Ranier in this example, which then can be associated with the image and potentially displayed as being a tag for that image, as illustrated in FIG. 3(b). Upon selection of a tag, the user might be presented with an updated list of tags 308 from which the user might select. This updated list might include only the previously suggested tags, minus any selected tag, or might include a different selection (or at least one new suggestion) each time a tag is selected. In FIG. 3(b), it can be seen that the tag "Washington" is now visible to the user on the display.

Figure 3C:
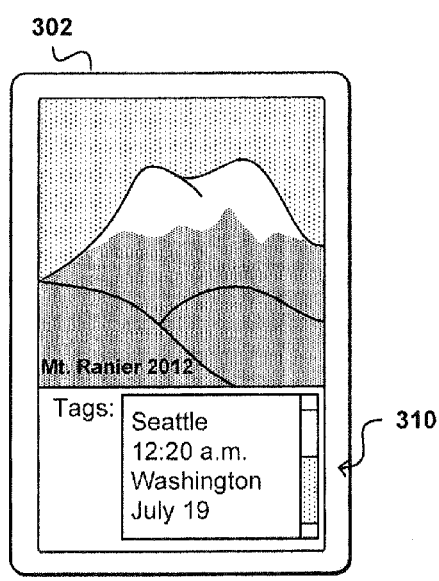

In at least some embodiments, the user can select multiple tags to associate with the image. For example, FIG. 3(c) illustrates that the user has selected a second tag ("2012") to associate with the image. The object might have a maximum number of tags in some embodiments, which might vary with the type or size of object, while in other embodiments the user can associate as many tags as desired. Each time, the user might be presented with a new set of suggestions 310. The user can also have other options as well, such as to delete or remove a previously selected tag, or reorder the selected tags (such as by dragging one tag in front of another, etc.).

The selection and ordering of tags can be based at least in part upon the results of a set of approaches such as those identified above. For example, a selection algorithm might utilize results corresponding to the date, time, location, direction, and other user tags at that location. The results of each of these approaches might be weighted differently in order to assist in ranking the results. For example, a date result might be weighted more highly than a tag from other users, while an image recognition result might be weighted most heavily. At least some of these approaches might have a range of weightings, however, which can vary based at least in part upon a level of certainty or other such criterion. For example, an image recognition result of the "White House" with a certainty of about 99% might get the highest weighting. An image recognition result of "Daytona Beach" with a certainty of about 65% might get a lower weighting, if selected at all.

The weightings, ranking, or scores of various terms can be adjusted, however, based at least in part upon results from other suggestion algorithms. For example, if a GPS-based algorithm also suggests "Daytona Beach," then that tag can rise in the rankings, have an increased suggestion score, etc. If, however, the result from an algorithm using tags from other users at that location includes "Cocoa Beach," then the ranking or score of Daytona Beach can be decreased.

In at least some embodiments, an application or service might suggest two or more conflicting tags if there is not a minimum level of certainty or consensus, or when their rankings or scores are relatively similar. For example, a device might display both "Cocoa Beach" and "Daytona Beach" to a user, knowing that at most one of those tags is accurate for that image. In at least some embodiments, the list of suggested tags can be dynamically updated based at least in part upon a selection of one of those terms by a user. For example, if a user selects the "Daytona Beach" tag then the "Cocoa Beach" tag might be removed from the list of suggestions. Similarly, any tags related to Cocoa Beach might be removed, and additional tags related to Daytona Beach might be displayed. The weightings of various terms might adjust as well once the location of the image is known, such as where a building can be identified with more certainty once it is determined that the user is in Daytona Beach.

In some embodiments, a suggestion algorithm will select a fixed number of tags from a ranked order of potential tags, such as to always present the top ten tags. Other embodiments can present a flexible number of tags, instead showing all tags that have a minimum amount of certainty or other minimum score. Various other approaches can be used as well within the scope of the various embodiments.

In some embodiments, the device might use certain contextual information to attempt to suggest appropriate tags. For example, if the user is in a museum in Kansas and takes a picture of a painting showing the Eiffel Tower, the device might determine based on contextual information (e.g., location, type of location, and content in the image determined via one or more recognition algorithms) that the user is not in Paris, but is taking a picture of an object recognized to be in Paris. The device then might suggest tags such as "museum" and "Kansas" based on location might also suggest tags such as "Eiffel Tower" and "Paris" based on image content, and might suggest a complex tag such as "work including the Eiffel tower at the Kansas Museum," etc. If the user is taking a picture of a painting of Mt. Rushmore at the same museum, other tags might be suggested as well as appropriate based on recognition, such as "Washington" and "Roosevelt." Thus, various parameters or dimensions of contextual or environmental information can be analyzed to attempt to determine appropriate tags, as discussed and suggested herein.

Figure 4:
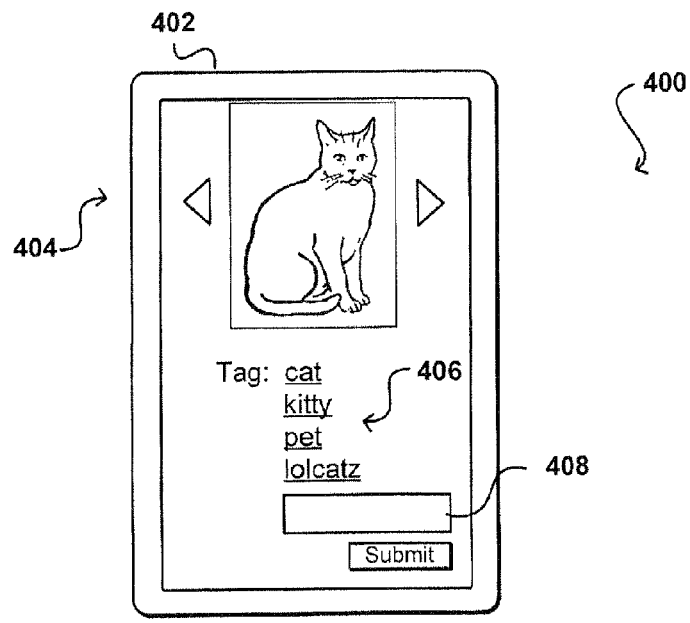
FIG. 4 illustrates an example of a tagging approach that can be captured in accordance with various embodiments.

FIG. 4 illustrates an example situation 400 where an image 404 captured and displayed by a device 402 is of an object, in this case a cat. An image of such an object might have a very different set of tags than was suggested for the location of FIG. 3 above, with the weightings or results of the various suggestion algorithms varying accordingly. For example, in this case the user might have been walking along a sidewalk and have seen a cat of interest that the user wanted to photograph. In this case there might be no consensus or sufficient frequency of user tags based on the location or direction in which the image was captured. When the image is of a random object at a random location, other approaches may produce results with higher scores. In this example, the weighting or scores of results from an image recognition algorithm might be the highest, such as where the algorithm identifies that the image is of, or at least contains, a cat. Accordingly, a tag such as "cat" might be the highest ranked tag suggestion. In some embodiments where there are not many suggestions from other suggestion algorithms, at least with a minimum suggestion ranking or score, other approaches can be used to suggest tags to the user.

For example, a suggestion algorithm might look at other terms users have used when tagging an image containing a cat. In this case, the term "kitty" might be used with sufficient frequency by other users tagging an image of a cat. A suggestion algorithm might also look at other common terms for a type of item, and thus might suggest a term like "pet." In some cases, a selection algorithm might use any of a number of sources of information to attempt to suggest particular terms. For example, an algorithm might use a search index to identify terms used by users when looking for information about cats. Another algorithm might look for terms used by sites including multiple images of cats. Various other information search or determination approaches can be used as well. From such a search, a tag such as "lolcatz" might be suggested based on that term being frequently used on the Internet with respect to images of cats. In many embodiments, a user who does not see any or all of the terms the user wants to use to tag an image in a selection list 406 can instead, or additionally, enter tag information in a text box 408 or other appropriate tag entry element.

Figure 5:
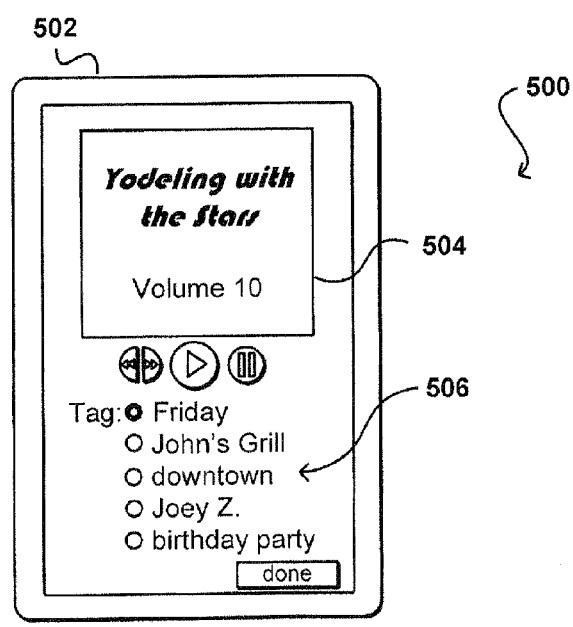
FIG. 5 illustrates an example of a tagging approach that can be captured in accordance with various embodiments.

While the examples above have focused primarily on images, it should be understood that such tagging approaches can be used for other types of file or object as well. For example, FIG. 5 illustrates an example situation 500 wherein a portable media device 502 is playing a song or audio file, as might be identified by a corresponding image 504 on a display of the device. The device can also enable a user to tag that audio file, such that the user can remember where the user was when he or she heard the song, who the user was with, etc. Such an approach can be desirable not only when the user intends to post the song to a social media file or otherwise share access to the file (e.g., via a link to a site legally hosting that file) but also to help the user later locate, identify, and/or retrieve the song. For example, in the image it can be seen that the list of tag suggestions 506 includes information about the date, location, type of event from consensus, and who the user is with, using approaches such as those discussed above. In at least some embodiments, the selection of tag suggestion algorithms or sources might be different for audio files than for images or various other types of objects. As discussed, while tags can be particularly beneficial for items such as media items, other files or objects such as documents or presentations can benefit from tagging as well as should be apparent in light of the teachings and suggestions contained herein.

Other types of contextual information can be determined, recorded, or otherwise stored or used for suggesting or ranking tags as well within the scope of various embodiments. For example, sounds recorded around a device such as a crowd cheering can be used to infer that the user is at a concert or other type of event at a particular location, while a sound such as sizzling of meat or dishes clinking together can be used to infer that the user is at a restaurant or other location where food is being prepared and/or served. If people are speaking, and permission is obtained as appropriate, the words spoken around the device can be analyzed to attempt to infer contextual information.

In some embodiments, contextual information can be obtained from other users nearby who are currently tagging information. In what can be referred to as "flash mob" style tagging, if a large number of users nearby start tagging at approximately the same time, that information can be aggregated and analyzed to attempt to suggest tags for certain information. Tags generated by one or more users might have a decay value or weighting applied such that the value of the tag decreases over time. If there is a large spike in tags, such as in the "flash mob" example, and then a drastic drop-off in tags of the same type, then that action can also be indicative that the tags may no longer be particularly relevant. For example, if the tags relate to an artist playing, a movie star spotted in a restaurant, or a fire happening at a particular location, those tags will likely only be relevant for a fixed period of time. Thus, in at least some embodiments the decay values applied to certain tags can be determined based at least in part upon the period of time over which similar tags were submitted. Thus, similar tags submitted over years at the same location might have a very long decay value, but tags only submitted over a five minute period of time might decay very quickly. Various other types of information can be determined as well within the scope of the various embodiments.

In some embodiments, users can also be able to provide feedback about suggested tags. For example, if a tag is suggested that a user does not think is relevant, the user can have the option of deleting that suggestion, which can be indicative of the irrelevance of that tag. In some embodiments, the user can provide a rating such as a "thumbs down" value that can provide input that the suggestion was not appropriate, or at least not valued by the user. Various other rating or feedback approaches can be used as well within the scope of the various embodiments.

As discussed, tagging of various files or objects can be desirable for various purposes other than for personal or social media-related purposes. Tags can be used to help locate or identify information in ways that can be more natural or intuitive for a user than filenames and folders. Further explanation and examples of such searching approaches can be found, for example, in co-pending U.S. patent application Ser. No. 12/950,896, filed Nov. 19, 2010, and entitled "Multi-Dimensional Data Association," which is hereby incorporated herein by reference.

Figure 6A:
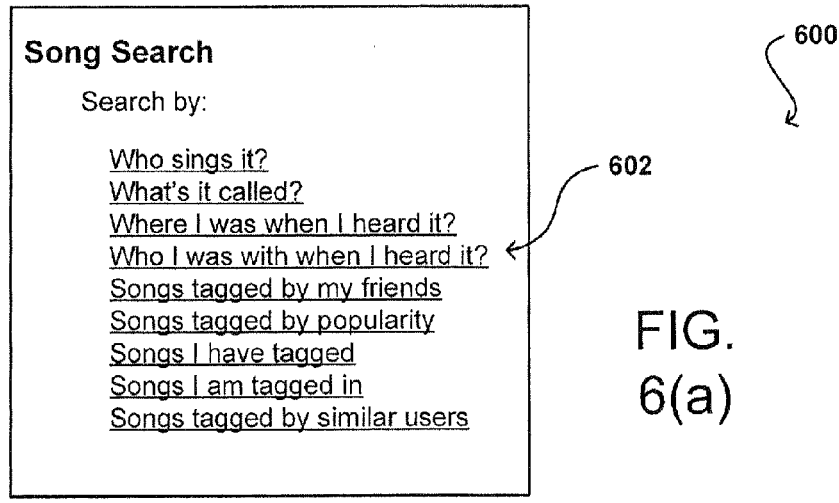
FIGS. 6(a), (b), and (c) illustrate an example of a tagging approach that can be captured in accordance with various embodiments.

FIG. 6(a) illustrates an example of a situation 600 in which a user is attempting to locate a song based at least in part upon tags applied to various songs, either by that user or other users. Further, this example presents an interface that enables the user to search using a natural language-based approach, although conventional or other search approaches could be used as well to enable a user to search by tag as should be apparent in light of the present disclosure. In this example, a set of searching options is displayed 602. There can be relatively conventional search options, such as the artist and title of the song, but in this case the search engine can look not only at metadata provided with various files but also for tags applied by the user. This approach also can enable other search options that correlate more directly with the way in which a user might think. For example, the interface can enable the user to search for songs by who the user was with when the user tagged the song, or where the user was when the song was tagged (or potentially even when the song was detected as being playing). Such an approach can be advantageous when a user cannot remember identifying information about the song, but might remember hearing the song while with a friend or in a specific location. If that friend or location was tagged with the song, the user can locate that song by searching on that parameter. In some embodiments, there might be "invisible" tags automatically associated with a file by a device, such that the user can search by friend or location even if the user did not apply those tags to the file. Such tags may or may not be visible to the user in various embodiments, and the user can have the option of disabling such information.

As illustrated, tags can be used to search in other ways as well. For example, a user can search for songs that other users have tagged, their friends or contacts have tagged, etc. In some embodiments the user can search for songs in which that user was tagged, such as where the user was present when a friend tagged that song. In some embodiments, a user can search for songs that were tagged by users with one or more similar aspects, users who tagged similar songs, etc. Various other options can be used as well within the scope of the various embodiments.

Figure 6B:
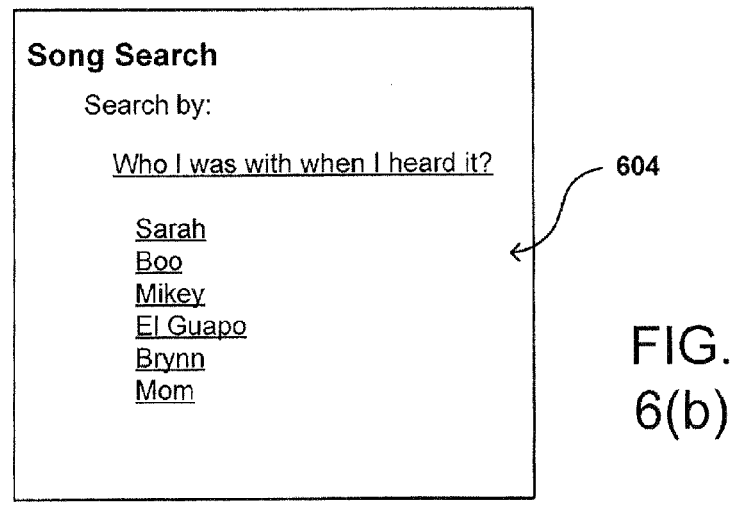
Figure 6C:
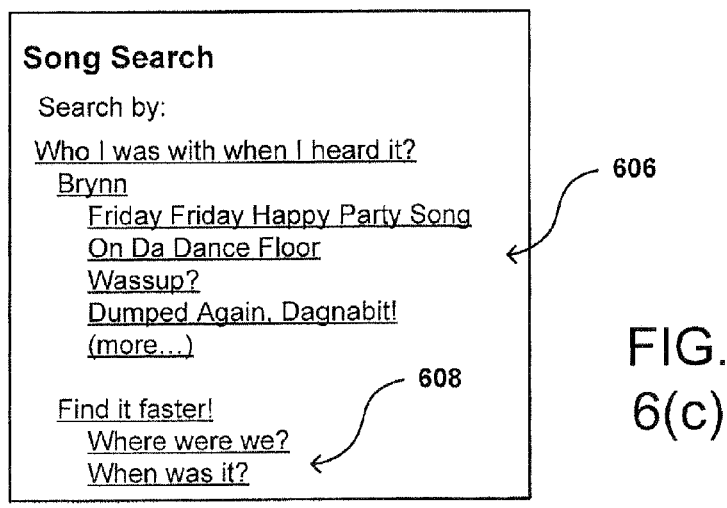

In FIG. 6(b) it can be seen that the user is attempting to locate a song by who the user was with when the user heard and/or tagged the song. In this example, a list of friends 604 who have been tagged by the user can be presented. This list can be sorted using any appropriate ordering, such as by most recent tags, most frequency tags, etc. When the user selects a friend from the suggestions, the user can be presented with a set of results 606 as illustrated in FIG. 6(c). If the user sees the song of interest, or songs that might be of interest, the user can select one or more of those songs to play the song, a clip of the song, access information, etc. If the list of songs is too long, or the user might otherwise like to further narrow the results, the user might be able to select one or more other search criteria. For example, the interface in this example displays some suggested search options 608 for narrowing the search, such as to input where the user was or when the user heard the song with the friend. Various other narrowing or refining approaches can be used as well as known in the art for searching. In at least some embodiments, at least some of the additional search criteria might not involve tags but other conventional search approaches.

Figure 7:
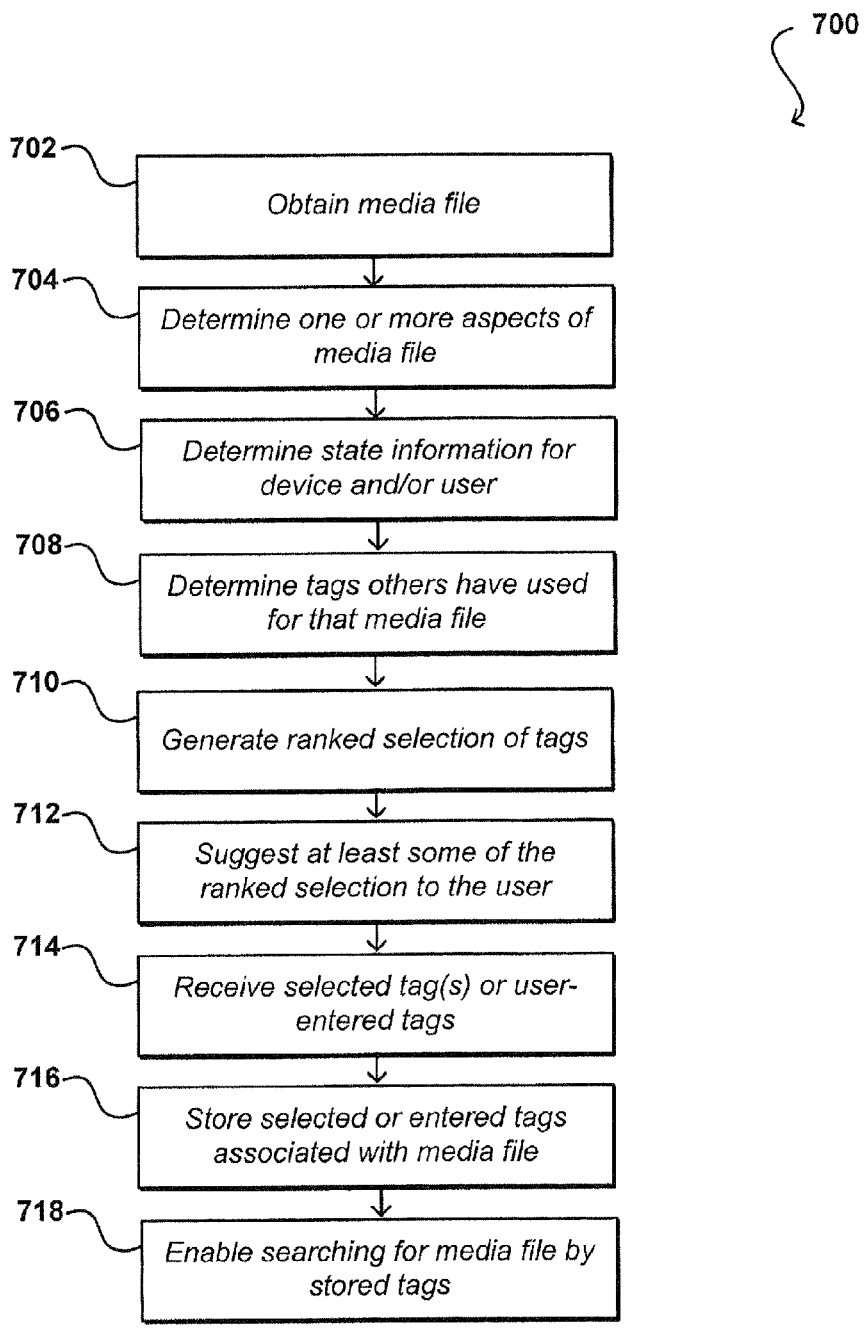
FIG. 7 an example process for tagging a digital object that can be used in accordance with various embodiments.

FIG. 7 illustrates an example process 700 for tagging an electronic file or object that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a media file is obtained for which a tag can be applied 702. The file can be obtained using any approach discussed herein, such as capturing or recording the file on a computing device used for the tagging or downloading the file from another source. Further, as discussed the file does not need to be a media file, but can be any appropriate electronic file or object as discussed herein.

As discussed, various approaches and types of information can be used to identify potential tags for the media file. In this example, the process includes determining one or more aspects of the media file 704, such as contents or descriptions of the file, contextual or environmental information relating to the time or location of image capture, etc. State information of the device and/or user can also be determined 706, such as location, direction, activity, mood, etc. Tags used by other users for that media file, or type of media file, also can be determined 708 using any approach discussed or suggested herein. It should be understood that these determinations do not need to be performed in any particular order, and in at least some embodiments can be performed concurrently.

Using these approaches, a set of potential tags can be generated and weighted or scored to produce a ranked listing of tag suggestions 710. As discussed, this can involve weighting the various selection algorithms and their results, with tags resulting from multiple algorithms being adjusted accordingly. The tag scores or weighting can also be adjusted by factors such as confidence levels, frequency, and the like. Using the ordered list, at least a portion of the suggested tags can be provided to the user 712. This can be, for example, a number of the highest ranked tags or the tags with a minimum confidence score, etc.

If at least one tag is selected or entered by the user 714, the tag(s) can be stored and/or otherwise associated with that media file 716. As discussed, this can involve storing the information in the media file itself or storing the tag in a location associated with, or mapped to, that media file. As discussed, multiple tags can be associated with an item or object, and the tags can be selected from a list of suggestions, manually entered by a user, or otherwise applied. Once at least one tag is associated with a file, the user can be enabled to search for that file using the tag(s) 718. Various other approaches can be used as well as discussed or suggested elsewhere herein.

In at least some embodiments, a suggestion algorithm can attempt to suggest one or more options that are complete tags for an object. For example, instead of separately suggesting "Mt. Ranier," "2012," and "vacation," the algorithm could suggest more complex tags such as "Vacation to Mt. Ranier in 2012" or "Mt. Ranier 2012" such that the user could suggest a single option to provide an appropriate tag for social networking, vacation albums, etc. If the user is at a location with friends who have all tagged images with a term or phrase such as "class reunion," the device might suggest a tag such as "Class reunion with Joan, Bobby, and Jenny." If a user takes a picture of a dish at a restaurant, the device might be able to identify the dish (potentially with help from an electronic menu and/or image recognition) and suggest a tag such as "Veggie Burger at the Green Café." Various other options and combinations are possible as well using the various options discussed or suggested herein.

Further, a device might adjust the types of tags that are suggested based at least in part upon the types of tags the user selects. For example, if a user always tags images with the date then the device can always include the date with suggestions. Similarly, if the user almost never uses the date as a tag, a suggestion algorithm can use date tag suggestions only when there are no other more highly ranked tag suggestions. And the tags might vary by type of file. For example, maybe the user always tags location in vacation photos, but often tags friends in songs. A user might always tag a file received from a friend with that friend's name. In some cases, an algorithm might get a consensus on that friend's name (e.g., Stephen vs. Steven or Steve) from various devices or other sources, and use that tag consistently for items tagged with that user's name. Meetings or calendar entries might usually be tagged with the names of participants, location, etc. Such feedback can be used to adjust one or more suggestion algorithms or weightings for a particular user, for specific types of file, etc.

Tags can be used for various other purposes as well. For example, a user can tag songs with specific tags, such as "workout," "chill," or "background" which later can be used to generate a playlist for a certain situation. If the user sets up specific playlists, those playlists might be used as tag suggestions for various songs. A user might take a picture of a bottle of wine, then tag that image with information such as where the user was and with whom the user had the wine. A device could potentially determine from facial expressions, amount of wine left unfinished, or conversation whether the people liked the wine. If the picture can be analyzed to determine the wine, the information can be stored to a wine database that can update wines the user has had, whether the wine was any good, etc. If a user frequently has the same wine (or type of wine) when with a friend, a wish or gift list could be generated for that friend that includes that information, such that if the user needs to get a gift for that friend the user can quickly determine items that the friend likes.

Figure 8:
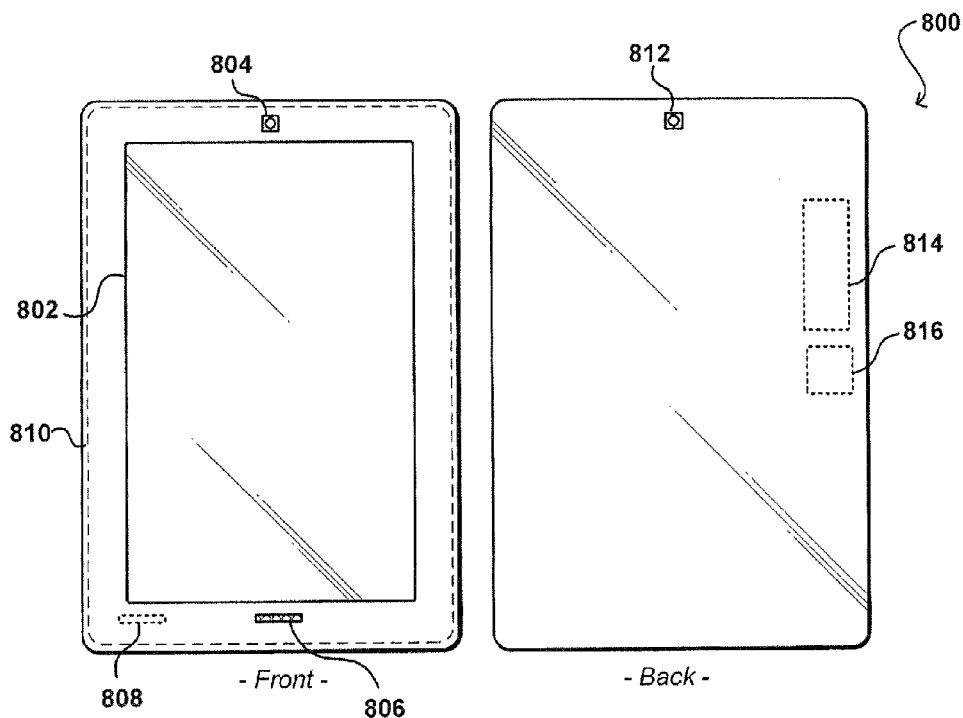
FIG. 8 illustrates front and back views of an example device that can be utilized in accordance with various embodiments.

FIG. 8 illustrates front and back views of an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The computing device in this example can include one or more image capture elements 804 on the front of the device and/or at least one image capture element 812 on the back of the device, although it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor or an infrared sensor, or other image capturing technology. The screen can be touch sensitive, and/or the casing of the device can have a touch- or pressure-sensitive material 810 providing for device input, such as to determine whether a user is holding the device.

The computing device can also include at least one microphone 806 or other audio capture elements capable of capturing audio data, such as words spoken by a user of the device, music being played near the device, or audio being generated by a nearby speaker or other such component, although audio elements are not required in at least some devices. The device 800 in this example also includes at least one motion- or position-determining element 808 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
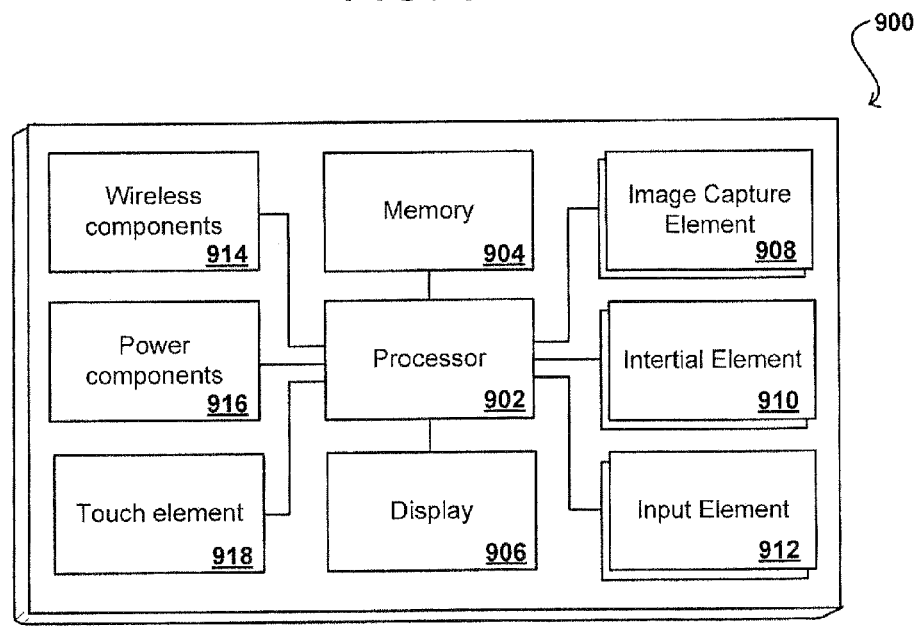
FIG. 9 illustrates an example configuration of components of a device such as that described with respect to FIG. 8.

FIG. 9 illustrates a set of basic components of a computing device 900 such as the device 800 described with respect to FIG. 8. In this example, the device 900 includes at least one processing unit 902 for executing instructions that can be stored in a memory device or element 904. As would be apparent to one of ordinary skill in the art, the device can include many types of memory, data storage or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers. The device can include at least one orientation or position sensing element 910, such as an accelerometer, a gyroscope, a compass, GPS, or inertial sensors, that can determine locations, detect motions or movement of the device, etc.

As discussed, the device in many embodiments will include at least one image capture element 908, such as one or more cameras that are able to image a user, people, or objects in the vicinity of the device. An image capture element can include any appropriate technology, such as a CCD image capture element having a sufficient resolution, focal range and viewable area, to capture an image of the user when the user is operating the device.

As discussed, the device in many embodiments will include at least one audio element, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device.

The device can include at least one additional input device 912 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The device can also include various power components 916 as known in the art for powering such devices.

The example device also can include at least one touch- and/or pressure-sensitive element 918, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 10:
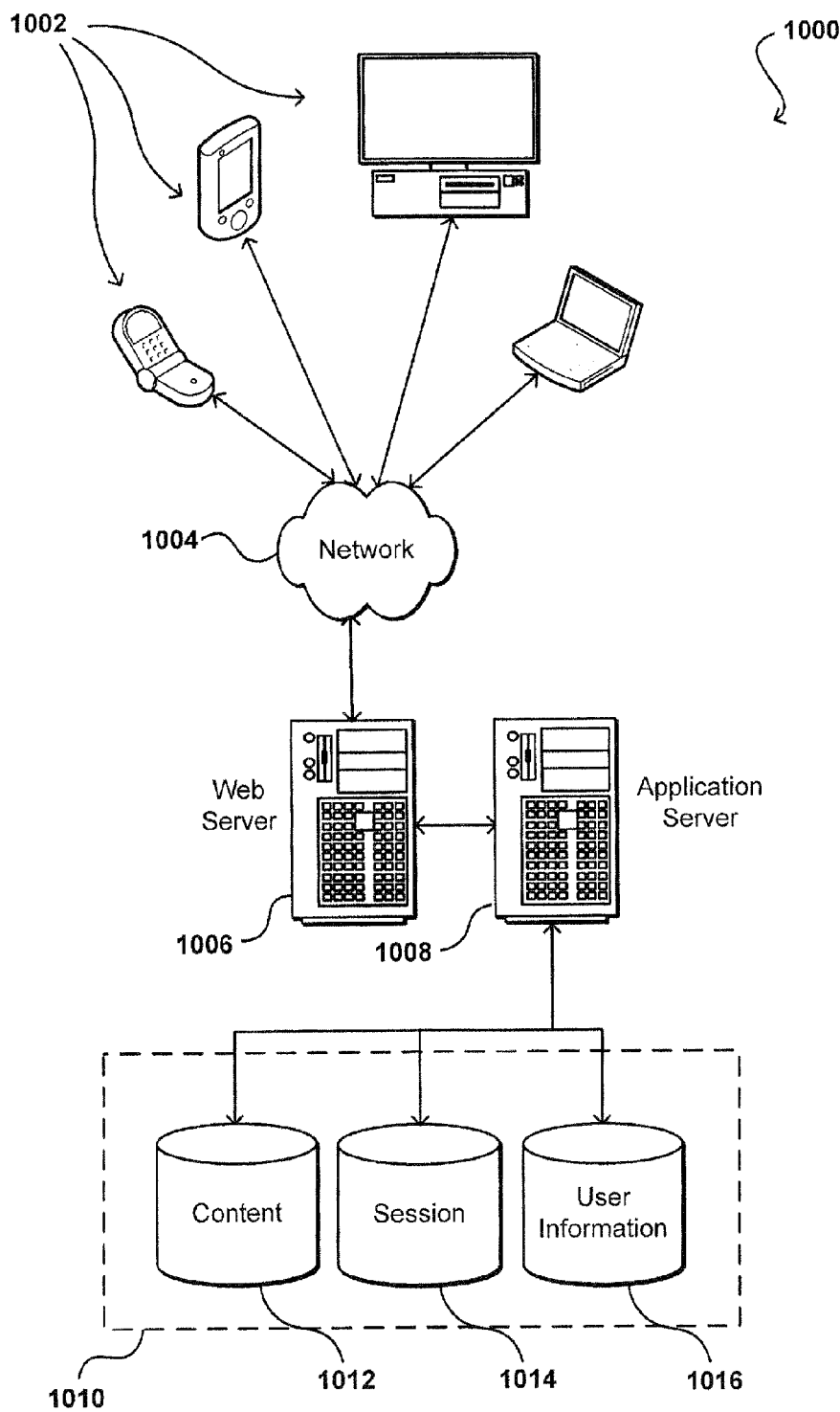
FIG. 10 illustrates an example environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, implemented by a computing device having at least one processor, the method comprising:
    capturing, using an image capture element of a computing device, an image;
    determining, using a processor of the computing device, a location of the computing device upon capturing the image;
    causing a set of tag suggestions associated with the location to be generated;
    determining a confidence score for each of the set of tag suggestions for the location;
    ranking the set of tag suggestions based at least in part upon the confidence score of each tag suggestion;
    identifying a first tag suggestion having a first confidence score within a determined range of a second confidence score of a second tag suggestion, each of the first confidence score and the second confidence score being below a minimum confidence score;
    providing at least a portion of highest ranking tag suggestions of the set of tag suggestions, including the first tag suggestion and the second tag suggestion, for use in tagging the image; and
    receiving an input corresponding to selection of the first tag suggestion or the second tag suggestion.

2. The method of claim 1, wherein the set of tag suggestions are generated by:
    analyzing the image using at least one image recognition algorithm; and
    identifying at least one object represented in the image, the confidence score for each of the set of tag suggestions further being based at least in part on the identified at least one object.

3. The method of claim 1, wherein the set of tag suggestions are generated by:
    determining user information stored on the computing device related to at least one of the location or a time the image was captured, the confidence score for each of the set of tag suggestions further being based at least in part on the determined user information.

4. The method of claim 1, further comprising:
    determining, using an electronic compass, a direction of the image capture element at an approximate time of capturing the image, the confidence score for each of the set of tag suggestions further being based at least in part on the determined direction of the image capture element.

5. The method of claim 1, further comprising:
    adjusting, in response to the first tag suggestion being selected, the first confidence score upward relative to the second confidence score for the location.

6. The method of claim 1, wherein the first confidence score being within the determined range of the second confidence score corresponds to the first confidence score and the second confidence score being substantially equal in numerical value to within the determined range.

7. The method of claim 1, wherein the first tag suggestion and the second tag suggestion are conflicting tag suggestions for a type of tag suggestion based at least in part on the first confidence score being within the determined range of the second confidence score.

8. A computing device, comprising:
a processor; and
memory including instructions that, when executed by the processor, cause the computing device to:
obtain an instance of digital content;
determine, using the processor, a location of the computing device upon obtaining the instance of digital content;
cause a set of tag suggestions associated with the location to be generated for the instance of digital content;
determine a confidence score for each of the set of tag suggestions for the location;
rank the set of tag suggestions based at least in part upon the confidence score of each tag suggestion;
identify, from the set of tag suggestions, two or more tag suggestions having substantially similar confidence scores or confidence scores below a threshold score;
provide at least a portion of highest ranking tag suggestions of the set of tag suggestions, including the two or more tag suggestions, for use in tagging the instance of digital content; and
receiving an input corresponding to selection of one of the two or more tag suggestions.

9. The computing device of claim 8, wherein the instructions, when executed by the processor, further cause the computing device to:
cause a user to choose between the two or more tag suggestion with relatively similar confidence scores below the threshold score.

10. The computing device of claim 8, wherein the two or more tag suggestions are conflicting tag suggestions for a type of tag suggestion based at least in part on the substantially similar confidence scores being within a determined range for the type of tag suggestion.

11. The computing device of claim 8, wherein the instructions, when executed by the processor, further cause the computing device to:
receive a selection of a tag from the set of tag suggestions; and
associate the tag with the instance of digital content, the tag being stored in the instance of digital content or stored in a location associated with the instance of digital content.

12. The computing device of claim 8, wherein the instructions, when executed by the processor, further cause the computing device to:
determine a selection of one or more tag suggestion algorithms for the instance of digital content, the selection being based at least in part upon a determined type of the digital content, a location determined using at least one location determining sensor, and a direction determined using an electronic compass.

13. The computing device of claim 8, wherein the instructions, when executed by the processor, further cause the computing device to:
determine user information stored on the computing device related to at least one of a location or a time the instance of digital content was obtained, the confidence score further being based at least in part on the determined user information.

14. The computing device of claim 8, wherein the instructions, when executed by the processor, further cause the computing device to:
monitor tags selected and not selected by a user for a respective type of digital content;
determine, based at least in part on the monitored tags, user preferences for the respective type of digital content; and
adjust future tag suggestions based at least in part upon the determined user preferences.

15. A non-transitory computer-readable storage medium storing instructions that, when executed by at least one processor, cause a computing device to:
obtain an instance of digital content;
determine a location of the computing device upon obtaining the instance of digital content;
cause a set of tag suggestions associated with the location to be generated;
determine a confidence score for each of the set of tag suggestions for the location;
rank the set of tag suggestions based at least in part upon a confidence score of a respective tag suggestion for the location;
identify two or more tag suggestions with relatively similar confidence scores below a threshold score;
provide at least a portion of highest ranking tag suggestions of the set of tag suggestions, including the two or more tag suggestions below the threshold score, for use in tagging the instance of digital content; and
receiving an input corresponding to selection of one of the two or more tag suggestions.

16. The non-transitory computer-readable storage medium of claim 15, wherein the instructions when executed further cause the processor to:
enable a user to select at least one of the tag suggestions as a tag to be associated with the instance of digital content.

17. The non-transitory computer-readable storage medium of claim 15, wherein the instructions when executed further cause the processor to:
analyze the instance of digital content using at least one recognition algorithm; and
identify at least one object represented in the instance of digital content, the confidence score being based at least in part on the identified at least one object.

18. The non-transitory computer-readable storage medium of claim 15, wherein the two or more tag suggestions are conflicting tag suggestions for a type of tag suggestion based at least in part on the relatively similar confidence scores being within a determined range for the type of tag suggestion.

19. The non-transitory computer-readable storage medium of claim 15, wherein the instructions when executed further cause the processor to:
monitor tags selected and not selected by a user for a respective type of instance of digital content;
determine, based at least in part on the monitored tags, user preferences for the respective type of digital content; and
adjust future tag suggestions based at least in part upon the determined user preferences.

20. The non-transitory computer-readable storage medium of claim 15, wherein the instructions when executed further cause the processor to:
receive a selection of a tag from the set of tag suggestions; and
associate the tag with the instance of digital content, the tag at least one of being stored in the instance of digital content or stored in a location associated with the instance of digital content.

* * * * *